US007105131B2

(12) United States Patent
Hilton

(10) Patent No.: US 7,105,131 B2
(45) Date of Patent: Sep. 12, 2006

(54) SYSTEMS AND METHODS FOR MICROELECTROMECHANICAL SYSTEM BASED FLUID EJECTION

(75) Inventor: Brian S. Hilton, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 572 days.

(21) Appl. No.: 10/064,980

(22) Filed: Sep. 5, 2002

(65) Prior Publication Data

US 2004/0046837 A1 Mar. 11, 2004

(51) Int. Cl.
*B01L 3/02* (2006.01)
*G01N 1/10* (2006.01)

(52) U.S. Cl. .................. 422/100; 436/180; 73/863.32; 73/864

(58) Field of Classification Search .......... 422/99–100; 436/180; 73/863.32, 864
See application file for complete search history.

(56) References Cited

U.S. PATENT DOCUMENTS

| | | | | |
|---|---|---|---|---|
| 4,520,375 | A | 5/1985 | Kroll | |
| 5,783,340 | A | 7/1998 | Farino et al. | |
| 5,798,283 | A | 8/1998 | Montague et al. | |
| 5,804,084 | A | 9/1998 | Nasby et al. | |
| 5,889,541 | A * | 3/1999 | Bobrow et al. | 347/55 |
| 5,919,548 | A | 7/1999 | Barron et al. | |
| 5,963,788 | A | 10/1999 | Barron et al. | |
| 6,053,208 | A | 4/2000 | Onishi et al. | |
| 6,264,850 | B1 * | 7/2001 | Silverbrook | 216/27 |
| 6,273,552 | B1 * | 8/2001 | Hawkins et al. | 347/48 |
| 6,315,914 | B1 * | 11/2001 | Silverbrook | 216/27 |
| 6,350,015 | B1 | 2/2002 | Gooray et al. | |
| 6,367,915 | B1 * | 4/2002 | Gooray et al. | 347/54 |
| 6,406,130 | B1 | 6/2002 | Gooray et al. | |
| 6,409,311 | B1 | 6/2002 | Gooray et al. | |
| 6,425,654 | B1 * | 7/2002 | Silverbrook | 347/44 |
| 6,491,833 | B1 * | 12/2002 | Silverbrook | 216/27 |
| 6,644,767 | B1 * | 11/2003 | Silverbrook | 347/11 |
| 6,673,315 | B1 * | 1/2004 | Sheridan et al. | 422/50 |
| 6,830,701 | B1 * | 12/2004 | DeBar et al. | 216/27 |
| 6,852,291 | B1 * | 2/2005 | Johnson et al. | 422/103 |
| 6,886,916 | B1 * | 5/2005 | Galambos et al. | 347/54 |
| 6,905,657 | B1 * | 6/2005 | Hubbard et al. | 422/100 |
| 2001/0045969 | A1 * | 11/2001 | Silverbrook | 347/11 |
| 2003/0027342 | A1 * | 2/2003 | Sheridan et al. | 436/43 |
| 2003/0109824 | A1 * | 6/2003 | Anderson et al. | 604/104 |

(Continued)

FOREIGN PATENT DOCUMENTS

| | | |
|---|---|---|
| JP | 61-059911 | 3/1986 |

(Continued)

*Primary Examiner*—Brian R. Gordon
(74) *Attorney, Agent, or Firm*—Oliff & Berridge, PLC; Eugene Palazzo

(57) ABSTRACT

A microelectromechanical system based fluid ejector comprises an ejector nozzle, a chamber that communicates with the ejector nozzle, and a plurality of movable ejection structures associated with the ejector nozzle and arranged to move in the chamber such that a variable volume of fluid is ejected from the associated ejector nozzle. The plurality of movable ejection structures may also be arranged to move in the chamber such that a continuous flow of fluid is ejected from the associated ejector nozzle. A controller may be used to actuate each of the plurality of movable ejection structures independently. The movable ejection structures may comprise a piston, a flexible diaphragm or the like. A plurality of actuators may be provided, with each of the actuators being associated with one of the ejection structures. The actuators may comprise electrostatic, magnetic or thermal actuators, or the like.

21 Claims, 1 Drawing Sheet

U.S. PATENT DOCUMENTS

| | | | | |
|---|---|---|---|---|
| 2003/0201245 | A1* | 10/2003 | Chen et al. | 216/27 |
| 2003/0229337 | A1* | 12/2003 | Broden | 604/891.1 |
| 2005/0041066 | A1* | 2/2005 | Silverbrook et al. | 347/54 |
| 2005/0099461 | A1* | 5/2005 | Silverbrook et al. | 347/54 |
| 2005/0190243 | A1* | 9/2005 | Matysiak | 347/85 |

FOREIGN PATENT DOCUMENTS

| | | |
|---|---|---|
| JP | 2-051734 | 2/1990 |
| JP | 2-289351 | 11/1990 |

* cited by examiner

SYSTEMS AND METHODS FOR MICROELECTROMECHANICAL SYSTEM BASED FLUID EJECTION

BACKGROUND OF THE INVENTION

1. Field of Invention

This present invention relates to micromachined or microelectromechanical system (MEMS) based fluid ejection and ejectors.

2. Description of Related Art

Fluid ejectors have been developed for ink jet recording or printing. Ink jet printing systems offer numerous benefits, including extremely quiet operation when printing, high speed printing, a high degree of freedom in ink selection, and the ability to use low cost plain paper. The so called "drop on demand" drive method, where ink is output only when required for printing, is now the conventional approach. The drop on demand drive method makes it unnecessary to recover ink not needed for printing.

Fluid ejectors for ink jet printing include one or more nozzles which allow the formation and control of small ink droplets to permit high resolution, resulting in the ability to print sharper characters with improved tonal resolution. In particular, drop on demand ink jet print heads are generally used for high resolution printers.

Drop on demand technology generally uses some type of pulse generator to form and eject drops. For example, in one type of print head, a chamber having an ink nozzle may be fitted with a piezoelectric wall that is deformed when a voltage is applied. As a result of the deformation, the fluid is forced out of the nozzle orifice as a drop. The drop then impinges directly on an associated printing surface. Use of such a piezoelectric device as a driver is described in JP B 1990 51734.

Another type of print head uses bubbles formed by heat pulses to force fluid out of the nozzle. The drops are separated from the ink supply when the bubbles form. Use of pressure generated by heating the ink to generate bubbles is described in JP B 1986 59911.

Yet another type of drop-on-demand print head incorporates an electrostatic actuator. This type of print head utilizes electrostatic force to eject the ink. Examples of such electrostatic print heads are disclosed in U.S. Pat. No. 4,520,375 to Kroll and Japanese Laid-Open Patent Publication No. 289351/90. The ink jet head disclosed in the 375 patent uses an electrostatic actuator comprising a diaphragm that constitutes a part of an ink ejection chamber and a base plate disposed outside of the ink ejection chamber opposite to the diaphragm. The ink jet head ejects ink droplets through a nozzle communicating with the ink ejection chamber, by applying a time varying voltage between the diaphragm and the base plate. The diaphragm and the base plate thus act as a capacitor, which causes the diaphragm to be set into mechanical motion and the fluid to exit responsive to the diaphragm's motion. On the other hand, the ink jet head discussed in the Japan 351 distorts its diaphragm by applying a voltage to an electrostatic actuator fixed on the diaphragm. This result in suction of additional ink into an ink ejection chamber. Once the voltage is removed, the diaphragm is restored to its non-distorted condition, ejecting ink from the overfilled ink ejection chamber.

Fluid drop ejectors may be used not only for printing, but also for depositing photoresist and other liquids in the semiconductor and flat panel display industries, for delivering drug and biological samples, for delivering multiple chemicals for chemical reactions, for handling DNA sequences, for delivering drugs and biological materials for interaction studies and assaying, and for depositing thin and narrow layers of plastics for usable as permanent and/or removable gaskets in micro machines.

SUMMARY OF THE INVENTION

This invention provides fluid ejection systems and methods having improved performance characteristics.

This invention separately provides fluid ejection systems and methods having improved response to actuation signals and improved control.

This invention provides fluid ejection systems and methods having improved efficiency.

This invention provides fluid ejection systems and methods requiring lower voltage to eject the fluid.

This invention provides fluid ejection systems and methods having increased drop generation rate.

This invention provides fluid ejection systems and methods having increased drop ejection velocities.

This invention provides fluid ejection systems and methods with variable drop size control.

This invention provides fluid ejection systems and methods that generate a fluid flow that is continuous and/or constant.

According to various exemplary embodiments of the systems and methods of this invention, a micromachined fluid ejector includes a plurality of movable ejection structures associated with an ejector nozzle. The fluid ejection structures are arranged to move within a fluid chamber, such that a variable volume of fluid is ejected from the associated ejector nozzle. Alternatively or additionally, the plurality of movable ejection structures are arranged to move within a fluid chamber such that a continuous flow of fluid is ejected from the associated ejector nozzle.

In various exemplary embodiments, the fluid ejectors according to this invention include a faceplate having an ejector nozzle, a substrate on which the faceplate is mounted, a chamber that communicates with the ejector nozzle, and a plurality of movable ejection structures associated with the ejector nozzle. The movable ejection structures are arranged to move in the chamber such that a variable volume of fluid is ejected from the associated ejector nozzle.

In various exemplary embodiments, the fluid ejectors according to this invention include a controller that actuates each of the plurality of movable ejection structures independently. The fluid ejectors according to this invention may also include a plurality of actuators, each of the actuators being associated with one of the ejection structures.

In various exemplary embodiments, each of the plurality of actuators comprises an electrostatic actuator. In other various exemplary embodiments, each of the plurality of actuators comprises a magnetic actuator. In still other various exemplary embodiments, each of the plurality of actuators comprises a thermal actuator.

In various exemplary embodiments, each of the plurality of movable ejection structures comprises a piston. In other various exemplary embodiments, each of the plurality of movable ejection structures comprises a flexible diaphragm.

In various exemplary embodiments, the method for ejecting fluid according to this invention includes the steps of: moving a first movable ejection structure within the chamber; moving a second movable ejection structure within the chamber; and controlling the moving of the first and second movable ejection structures such that a variable volume of fluid is ejected from the associated ejector nozzle.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention are described in detail below, with reference to the attached drawing figures, in which.

DETAILED DESCRIPTION OF EXEMPLARY EMBODIMENTS

Figure 1:
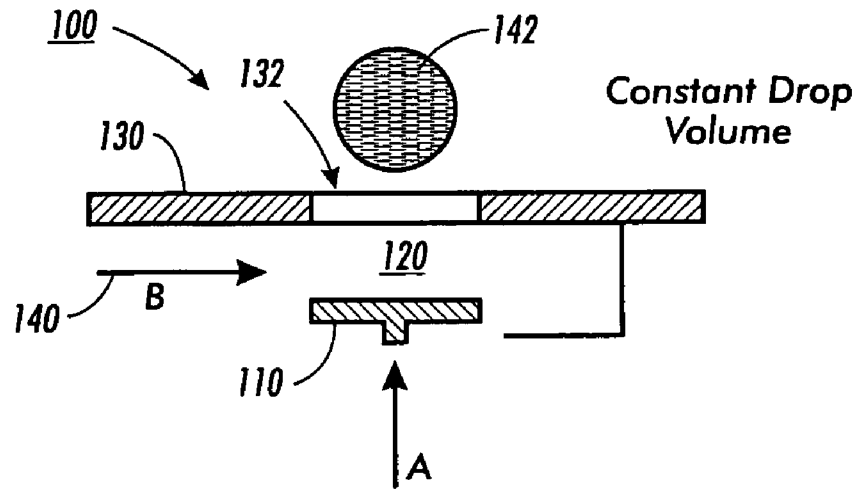
FIG. 1 is a schematic cross-sectional view of an exemplary fluid ejector.

The fluid ejectors according to this invention include electrostatically or magnetically driven piston structures whose movement ejects a relatively small amount of fluid, commonly referred to as a drop or droplet. The fluid ejectors according to this invention may be fabricated using the SUMMIT processes or other suitable micromachining processes. The SUMMIT processes are covered by various U.S. patents belonging to Sandia National Labs, including U.S. Pat. Nos. 5,783,340; 5,798,283; 5,804,084; 5,919,548; 5,963,788; and 6,053,208, each of which is incorporated herein by reference in its entirety. The SUMMIT processes are primarily covered by the '084 and '208 patents. In particular, the methods discussed in copending U.S. patent application Ser. No. 09/723,243, incorporated herein by reference in its entirety, may be used.

Various design configurations of the micromachined fluid ejectors of the present invention are discussed in copending U.S. patent application Ser. Nos. 09/718,476, 09/718,495, 09/722,331 and 09/785,160, each of which is filed herewith and incorporated herein by reference in its entirety. Any of these design configurations, or modifications thereof, may be used with this invention. As with the systems and methods of this invention, these design configurations generally comprise an ejection structure that is movably mounted within a fluid chamber. Movement of the ejection structure relative to a faceplate causes a fluid drop to be ejected through a nozzle hole.

Such movement can be effectuated through any suitable drive system. However, electrostatic and magnetic forces are particularly applicable. For example, electrostatic or magnetic attraction of the ejection structure to the faceplate may be used to drive the ejection structure. Alternatively, electrostatic or magnetic attraction of the ejection structure to a baseplate on a side of the ejection opposite the faceplate may be used to displace the ejection structure away from the faceplate. In such a case, the ejection structure is resiliently mounted so that a restoring force is generated to move the ejection structure to its undisplaced position to eject a fluid drop. It should be understood that the ejection structure may be attracted to other parts of the fluid ejector as well, such as in an "edge shooter" configuration. Another exemplary drive system suitable for this invention is an electrostatic comb drive. As described above, movement of the ejection structure causes a portion of the fluid between the ejection structure and the faceplate to be forced out of the nozzle hole in the faceplate, forming a drop or jet of fluid.

According to various embodiments of this invention, a plurality of movable ejection structures associated with an ejector nozzle are arranged to move within a fluid chamber such that a variable volume of fluid is ejected from the associated ejector nozzle. This provides a variable drop size that is useful, for example, for improved print quality (resolution) by obtaining increased levels of gray and for improved print speed by obtaining larger coverage area per drop.

According to other various embodiments of this invention, a plurality of movable ejection structures associated with an ejector nozzle are arranged to move within a fluid chamber such that a continuous flow of fluid is ejected from the associated ejector nozzle. This provides a desired volume of fluid by generating an uninterrupted flow for a desired period of time, rather than multiple discrete drops of fluid. In various embodiments, the flow of fluid generated by movement of the plurality of movable ejection structures may be at a constant flow rate.

FIG. 1 shows an exemplary schematic of a microelectromechanical system (MEMS) based fluid ejector 100. According to this configuration, the ejector 100 comprises a movable ejection structure 110, such as a piston, and a stationary faceplate 130. A fluid chamber 120 is defined between the ejection structure 110 and the faceplate 130. A fluid 140 to be ejected is supplied in the fluid chamber 120 from a fluid reservoir (not shown). The faceplate 130 includes a nozzle hole 132 through which a fluid jet or drop is ejected.

In this exemplary schematic, the ejection structure 110 is actuated or driven, for example, by a controller 150, to move towards the faceplate 130. As a result of the movement of the ejection structure 110, a portion of the fluid 140 between the ejection structure 110 and the faceplate 130 is forced out of the nozzle hole 132, forming a jet or drop 142 of the fluid.

The ejection structure 110 has a maximum stroke, or movement distance, that determines the maximum drop size that can be obtained. Unless the stroke is varied, the drop size is constant. Unfortunately, varying the stroke is unpractical because modulation control of the stroke is difficult and presents complex design considerations. Further, the maximum stroke is limited by design constraints on the size of a microelectromechanical system (MEMS) based fluid ejector.

Figure 2:
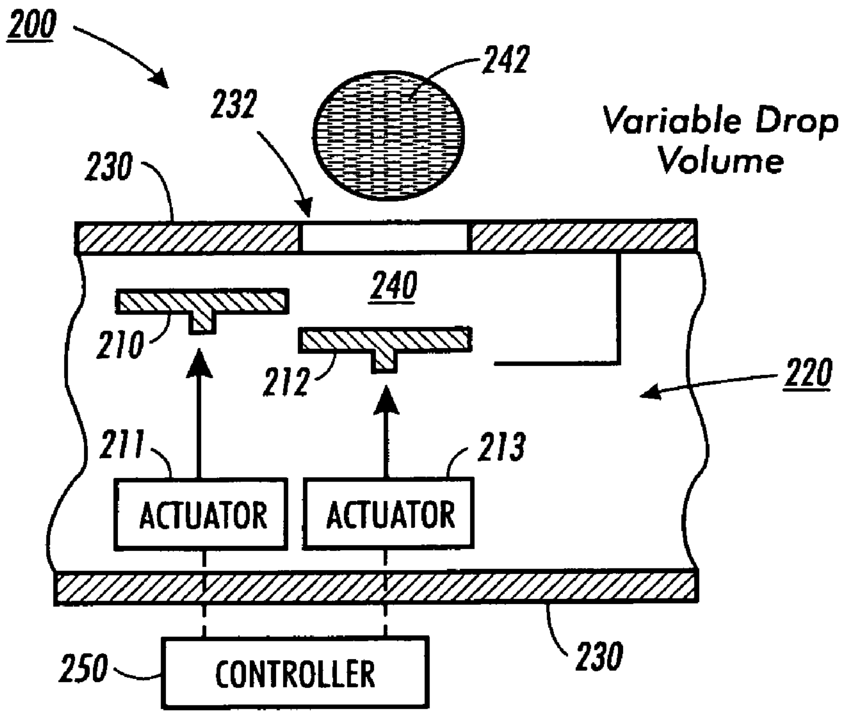
FIG. 2 is a schematic cross-sectional view of an exemplary embodiment of a fluid ejector according to this invention.

FIG. 2 schematically shows an exemplary embodiment of a microelectromechanical system (MEMS) based fluid ejector 200 according to this invention. The ejector 200 comprises a first movable ejection structure 210, a second movable ejection structure 212 and a stationary faceplate 230. A fluid chamber 220 is defined between the ejection structures 210, 212 and the faceplate 230. A fluid 240 to be ejected is supplied in the fluid chamber 220 from a fluid reservoir (not shown). The faceplate 230 includes a nozzle hole 232 through which a fluid jet or drop is ejected.

In this exemplary embodiment, the ejection structures 210 and 212 are individually actuated or driven, for example, by a respective actuator 211, 213 controlled by a controller 250, to move towards the faceplate 230. As a result of the movement of the ejection structures 210 and 212, a portion of the fluid 240 between the ejection structures 210, 212 and the faceplate 230 is forced out of the nozzle hole 232, forming a jet or drop 242 of the fluid.

The first and second ejection structures 210 and 212 may be actuated or driven independently and may be controlled by the controller 250 to produce a variable drop size. For example, by actuating or driving only one of the ejection structures 210, 212, a relatively smaller drop size may be ejected. On the other hand, by actuating or driving only both of the ejection structures 210, 212, a relatively larger drop size may be ejected.

While two ejection structures are shown in the exemplary embodiment, it should be understood that any number of movable ejection structures may be used.

Each of the movable ejection structures may have a different predetermined stroke. In such a case, each of the ejection structures may be actuated or driven, either alone or in combination, to achieve a desired drop size.

Further, a plurality of movable ejection structures may be actuated or driven to create a flow of the fluid to be ejected towards the ejector nozzle. This may not only increase the maximum drop size that is obtainable, but may also improve the efficiency of the fluid ejector. For example, each of a plurality of ejection structures may be actuated or driven in successive order from an ejection structure that is farthest from the ejector nozzle to an ejection structure that is nearest the ejector nozzle. Also, this may be performed from one or more directions, for example, from opposite sides of the ejector nozzle.

Further, a plurality of movable ejection structures may be actuated or driven to generate ejection of the fluid as a stream or continuous flow of fluid. This may not only increase the volume of the fluid that is obtainable, but may also improve the rate of fluid ejection, improve the frequency response of the fluid ejector, or render the fluid ejector suitable for applications where the generation of discrete drops is not desired. For example, each of a plurality of ejection structures may be actuated or driven with a desired timing such that fluid is continuously ejected from the ejector nozzle. The timing may also be such that a flow rate of the fluid from the ejector nozzle is constant.

Any suitable controller, either known or hereafter developed, may be used for the controller 250. The particular design of the controller 250 will depend on the method of actuating or driving the ejection structures, the desired control scheme, and other design considerations, such as location or materials. In general, the controller 250 may be capable of selectively actuating or driving each of the ejection structures and/or actuating or driving each of the ejection structures according to a particular timing.

While this invention has been described in conjunction with an exemplary embodiment outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The movable ejection structures may be any suitable structure, either known or hereafter developed, that is capable of implementation in a microelectromechanical system based fluid ejector. Thus, while a piston structure is shown in the exemplary embodiment, other suitable structures, such as diaphragms, membranes or films, are contemplated. Further, the particular configuration of the fluid ejector is not limited to the exemplary embodiment described above. On the contrary, various configurations for a microelectromechanical system based fluid ejector, either known or hereafter developed, are contemplated.

What is claimed is:

1. A microelectromechanical system based fluid ejector, comprising:

an ejector nozzle;

a chamber that communicates with the ejector nozzle; and a plurality of movable ejection structures associated with the ejector nozzle and arranged to individually move in the chamber, each of the ejection structures being configured to cause ejection of fluid from the associated ejector nozzle by moving, such that a variable volume of fluid is ejected from the associated ejector nozzle based on independent movement of the ejection structures.

2. The ejector of claim 1, further comprising a medical fluid within the chamber.

3. The ejector of claim 2, wherein the medical fluid is a drug.

4. The ejector of claim 2, wherein the medical fluid is a biological material.

5. The ejector of claim 1, further comprising a controller that independently actuates a corresponding actuator of each of the plurality of movable ejection structures.

6. The ejector of claim 1, wherein each of the plurality of movable ejection structures comprises a piston.

7. The ejector of claim 1, wherein each of the plurality of movable ejection structures comprises a flexible diaphragm.

8. The ejector of claim 1, further comprising a plurality of actuators, each of the actuators being associated with one of the ejection structures.

9. The ejector of claim 8, wherein each of the plurality of actuators comprises an electrostatic actuator.

10. The ejector of claim 8, wherein each of the plurality of actuators comprises a magnetic actuator.

11. The ejector of claim 8, wherein each of the plurality of actuators comprises a thermal actuator.

12. A method for ejecting a fluid using a microelectromechanical system based fluid ejector having a chamber, an ejector nozzle and a plurality of movable ejection structures disposed in the chamber and associated with the ejector nozzle, the method comprising:

moving a first movable ejection structure within the chamber, the first movable ejection structure causing ejection of fluid from the associated ejector nozzle by the moving;

moving a second movable ejection structure within the chamber, the first movable ejection structure causing ejection of fluid from the associated ejector nozzle by the moving; and wherein the movement of the first and second movable ejection structures is independently controlled such that discrete drops or a continuous flow of fluid is ejected from the associated ejector nozzle based on the independent movement of the first and second movable ejection structures.

13. The method of claim 12, wherein controlling the movement of the first and second movable ejection structures is such that a continuous flow of fluid is ejected from the associated ejector nozzle.

14. The method of claim 13, wherein a flow rate of the continuous flow of fluid is constant.

15. The method of claim 12, wherein controlling the movement of the first and second movable ejection structures such that discrete drops of fluid having variable volumes of fluid are ejected from the associated ejector nozzle and the fluid is a medical fluid.

16. The method of claim 15, wherein ejecting the medical fluid comprises ejecting at least one of a drug and a biological material.

17. The method of claim 12, wherein controlling the movement of the first and second movable ejection structures comprises controlling a plurality of actuators, each of the actuators being associated with one of the ejection structures.

18. The method of claim 12, wherein controlling the movement of the first and second movable ejection structures comprises electrostatically controlling the moving of the first and second movable ejection structures.

19. The method of claim 12, wherein controlling the movement of the first and second movable ejection structures comprises magnetically controlling the movement of the first and second movable ejection structures.

20. The method of claim 12, wherein controlling the movement of the first and second movable ejection structures comprises thermally controlling the movement of the first and second movable ejection structures.

21. The method of claim 12, further comprising independently actuating corresponding actuators of each of the plurality of movable ejection structures.

* * * * *